(12) United States Patent
Lee et al.

(10) Patent No.: US 10,036,846 B2
(45) Date of Patent: Jul. 31, 2018

(54) BACKLIGHT MODULE, DRIVING METHOD THEREOF, AND DISPLAY APPARATUS USING THE BACKLIGHT MODULE

(71) Applicant: Young Lighting Technology Inc., Hsin-Chu (TW)

(72) Inventors: Chien-Hui Lee, Hsin-Chu (TW);
Ching-Hsiang Li, Hsin-Chu (TW);
Chin-Ku Liu, Hsin-Chu (TW);
Jhong-Hao Wu, Hsin-Chu (TW)

(73) Assignee: YOUNG LIGHTING TECHNOLOGY INC., Hsin-chu (TW)

( * ) Notice: Subject to any disclaimer, the term of this patent is extended or adjusted under 35 U.S.C. 154(b) by 49 days.

(21) Appl. No.: 15/222,104

(22) Filed: Jul. 28, 2016

(65) Prior Publication Data

US 2017/0153383 A1 Jun. 1, 2017

(30) Foreign Application Priority Data

Nov. 27, 2015 (TW) .............................. 104139767 A

(51) Int. Cl.
*F21V 8/00* (2006.01)

(52) U.S. Cl.
CPC ......... *G02B 6/0076* (2013.01); *G02B 6/0026* (2013.01); *G02B 6/0053* (2013.01); *G02B 6/0055* (2013.01); *G02B 6/0068* (2013.01)

(58) Field of Classification Search
CPC .. G02B 6/0076; G02B 6/0026; G02B 6/0053; G02B 6/0055; G02B 6/0068; G02B 6/0011; G02B 6/005; G02B 6/0075; G02B 6/0028; F21V 2200/00; F21V 2200/20; G02F 1/133615

See application file for complete search history.

(56) References Cited

U.S. PATENT DOCUMENTS

| | | | |
|---|---|---|---|
| 5,956,107 A * | 9/1999 | Hashimoto | G01D 11/28 349/62 |
| 7,796,215 B2 * | 9/2010 | Misono | G02B 6/005 349/56 |
| 2005/0174529 A1 | 8/2005 | Fukushima et al. | |

(Continued)

FOREIGN PATENT DOCUMENTS

| | | |
|---|---|---|
| JP | 2008235245 A | 10/2008 |
| TW | 201031969 A1 | 9/2010 |
| TW | 201232122 A1 | 8/2012 |

*Primary Examiner* — Bao Q Truong
(74) *Attorney, Agent, or Firm* — Li-Jen Shen

(57) ABSTRACT

A backlight module includes a first surface light source assembly, a second surface light source assembly disposed above the first surface light source assembly, a first optical film disposed above the second surface light source assembly and including a plurality of prisms arranged along a first direction, and a light filter element disposed between the first and second surface light source assemblies. Both of the first surface light source assembly and the second surface light source assembly include a light emitting unit and a light guide plate. Each prism has a tip end facing the second surface light source assembly. The light filter element is configured to allow an incident light ray within a predetermined range of incident angle to pass therethrough. The backlight module can be switched between a narrow viewing angle mode and a wide viewing angle mode. Related driving method and display apparatus are also provided.

22 Claims, 8 Drawing Sheets

(56) References Cited

U.S. PATENT DOCUMENTS

| | | |
|---|---|---|
| 2006/0109396 A1 | 5/2006 | Tsai et al. |
| 2008/0112187 A1* | 5/2008 | Katsumata ............ G02B 6/0068 |
| | | 362/611 |
| 2008/0218657 A1* | 9/2008 | Hwang ................ G02B 6/0076 |
| | | 349/62 |
| 2012/0050342 A1 | 3/2012 | Huang |
| 2012/0235891 A1* | 9/2012 | Nishitani ............. G02B 3/0056 |
| | | 345/102 |

\* cited by examiner

BACKLIGHT MODULE, DRIVING METHOD THEREOF, AND DISPLAY APPARATUS USING THE BACKLIGHT MODULE

CROSS-REFERENCE TO RELATED APPLICATION

This application claims the priority benefit of Taiwan application serial no. 104139767, filed on Nov. 27, 2015. The entirety of the above-mentioned patent application is hereby incorporated by reference herein and made a part of this specification.

FIELD OF THE INVENTION

The present invention relates to a surface light source module, and more particularly to backlight module, driving method thereof and display apparatus using the backlight module.

BACKGROUND OF THE INVENTION

With the development of flat display technology, most of the traditional cathode ray tube (CRT) display apparatuses have been replaced by the flat display apparatuses. In general, the common flat display apparatuses include liquid crystal display apparatuses, organic light emitting diode display apparatuses, electrophoretic display apparatuses, etc. Among them, the liquid crystal display apparatuses have the highest popularizing rate.

Based on the viewing angle, the conventional liquid crystal display apparatuses can be roughly divided into the narrow viewing angle liquid crystal display apparatuses and the wide viewing angle liquid crystal display apparatuses. The narrow viewing angle liquid crystal display apparatus has higher privacy, and the wide viewing angle liquid crystal display apparatus is suitable for more than one person at the same time.

However, users may have different displaying needs depending on the actual situations. The conventional liquid crystal display apparatus cannot be switched between a narrow viewing angle mode and a wide viewing angle mode, it is quite inconvenient for users.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The present invention provides a backlight module capable of being switched between a narrow viewing angle mode and a wide viewing angle mode.

The present invention also provides a driving method of a backlight module. The driving method of a backlight module is able to drive the backlight module to provide a narrow viewing angle surface light source or a wide viewing angle surface light source according to certain needs.

The present invention further provides a display apparatus capable of being switched between a narrow viewing angle mode and a wide viewing angle mode.

Other objects and advantages of the invention may be further illustrated by the technical features broadly embodied and described as follows.

To achieve one or a portion of or all of the objects or other objects, one embodiment of the invention provides a backlight module, which includes a first surface light source assembly, a second surface light source assembly, a first optical film and a light filter element. The first surface light source assembly includes a first light emitting unit and a first light guide plate. The first light emitting unit is disposed adjacent to a first light-incident surface of the first light guide plate. The second surface light source assembly is disposed above the first surface light source assembly and includes a second light emitting unit and a second light guide plate. The second light emitting unit is disposed adjacent to a second light-incident surface of the second light guide plate. The first optical film is disposed above the second surface light source assembly and includes a plurality of prisms arranged along a first direction. Each one of the plurality of prisms has a tip end facing the second surface light source assembly. The first direction is perpendicular to the first light-incident surface and the second light-incident surface. The light filter element is disposed between the first surface light source assembly and the second surface light source assembly. The light filter element is configured to allow an incident light ray within a predetermined range of incident angle to pass through the light filter element.

To achieve one or a portion of or all of the objects or other objects, one embodiment of the invention provides a driving method of a backlight module. The driving method includes: driving the first light emitting unit and the second light emitting unit of the backlight module to emit light rays when a wide viewing angle surface light source is desired to be provided; and driving the second light emitting unit to emit light rays and turning off the first light emitting unit when a narrow viewing angle surface light source is desired to be provided.

To achieve one or a portion of or all of the objects or other objects, one embodiment of the invention provides a display apparatus, which includes the aforementioned backlight module and a display panel disposed above the backlight module.

In summary, according to the backlight mode and the driving method thereof according to the embodiments of the present invention, a wide viewing angle surface light source is provided by turning on both of the first light emitting unit and the second light emitting unit; and a narrow viewing angle surface light source is provided by turning off the first light emitting unit and turning on the second light emitting unit. Therefore, the backlight module of the present invention can be switched between the wide viewing angle mode and the narrow viewing angle mode and accordingly the display apparatus employing the aforementioned backlight module of the present invention can be switched between the wide viewing angle mode and the narrow viewing angle mode.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
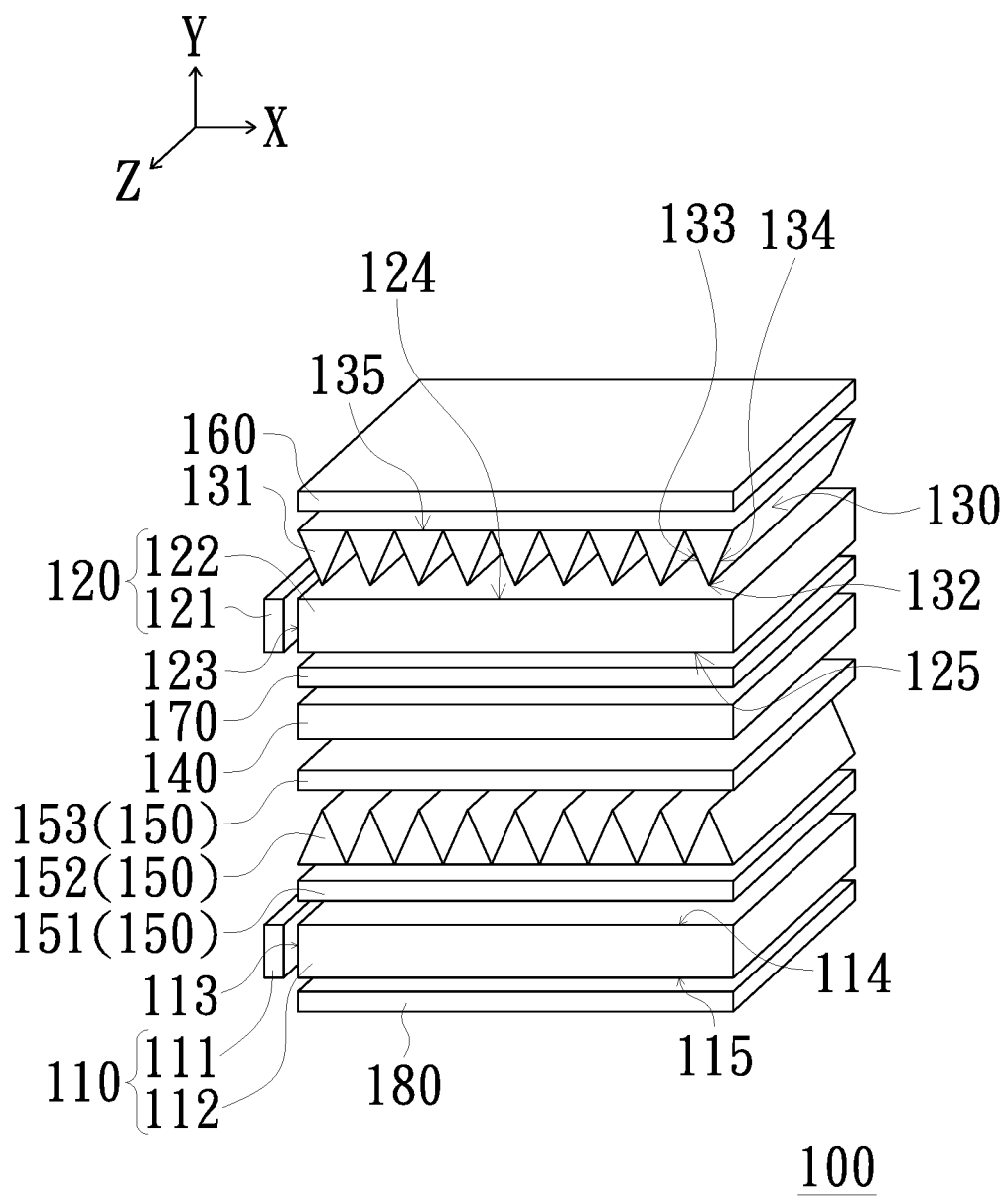
FIG. 1 is a schematic view of a backlight module in accordance with an embodiment of the present invention.

FIG. 1 is a schematic view of a backlight module in accordance with an embodiment of the present invention. As shown in FIG. 1, the backlight module 100 of the present embodiment includes a first surface light source assembly 110, a second surface light source assembly 120, a first optical film 130 and a light filter element 140. The first surface light source assembly 110 includes a first light emitting unit 111 and a first light guide plate 112. The first light guide plate 112 has a first light-exiting surface 114, a first bottom surface 115 and a first light-incident surface 113. The first light-exiting surface 114 and the first bottom surface 115 are disposed opposite to each other; and the first light-incident surface 113 is disposed between the first light-exiting surface 114 and the first bottom surface 115. The first light emitting unit 111 is disposed adjacent to the first light-incident surface 113 of the first light guide plate 112. The second surface light source assembly 120 is disposed above the first surface light source assembly 110 and includes a second light emitting unit 121 and a second light guide plate 122. The second light guide plate 122 has a second light-exiting surface 124, a second bottom surface 125 and a second light-incident surface 123. The second light-exiting surface 124 and the second bottom surface 125 are disposed opposite to each other; and the second light-incident surface 123 is disposed between the second light-exiting surface 124 and the second bottom surface 125. The second light emitting unit 121 is disposed adjacent to the second light-incident surface 123 of the second light guide plate 122. The first optical film 130 is disposed above the second surface light source assembly 120 and includes a plurality of prisms 131 arranged along a first direction (e.g., X-axis direction). Each prism 131 has a tip end 132 which faces the second surface light source assembly 120. In the present embodiment, the axis extending direction of the prism 131 extends toward a second direction (e.g., Z-axis direction); and the first direction is perpendicular to the second direction. The light filter element 140 is disposed between the first surface light source assembly 110 and the second surface light source assembly 120. The light filter element 140 is configured to allow an incident light ray within a predetermined range of incident angle to pass therethrough.

The first light emitting unit 111 is configured to provide a light ray to emit into the first light guide plate 112 via the first light-incident surface 113. The first light guide plate 112 is configured to convert the light ray into a first surface light source which then emits out from the first light-exiting surface 114 of the first light guide plate 112. The second light emitting unit 121 is configured to provide a light ray to emit into the second light guide plate 122 via the second light-incident surface 123. The second light guide plate 122 is configured to convert the light ray into a second surface light source which then emits out from the second light-exiting surface 124 of the second light guide plate 122. Both of the first light emitting unit 111 and the second light emitting unit 121 include a substrate (not shown) and a plurality of light emitting elements (such as light emitting diodes, not shown) disposed on the respective substrate, and the present invention is not limited thereto. The type of the first light emitting unit 111 and the second light emitting unit 121 is not limited in the present invention. Further, the first bottom surface 115 of the first light guide plate 112 and the second bottom surface 125 of the second light guide plate 122 may be provided with microstructures (not shown), so as to adjust the light shapes emitting out from the first light-exiting surface 114 and the second light-exiting surface 124. The aforementioned microstructures can be patterns, grooves, etc., and the present invention is not limited thereto.

The first optical film 130 may be an inverse prism sheet or a composite optical film having an inverse prism structure, so that the light rays with different light-incident angles will have different light-exiting angles when emitting out from the first optical film 130. For example, if the light ray emitting into the prisms 131 via the first surfaces 133 of the prisms 131 thereof has a relatively-large light-incident angle, the light ray will be sequentially refracted to the second surface 134 of the prisms 131, reflected by the second surface 134 and then emit out from a light-exiting side 135 of the first optical film 130 with a relatively-small light-exiting angle. Alternatively, if the light ray emitting into the prisms 131 via the first surfaces 133 thereof has a relatively-small light-incident angle, the light ray will be refracted and then directly emit out from the light-exiting side 135 of the first optical film 130 with a relatively-large light-exiting angle. Further, the axis extending direction of each prism 131 may be parallel to the Z-axis direction. The tip end 132 of each prism 131 may have a chamfering, such as a round chamfering.

Figure 2A:
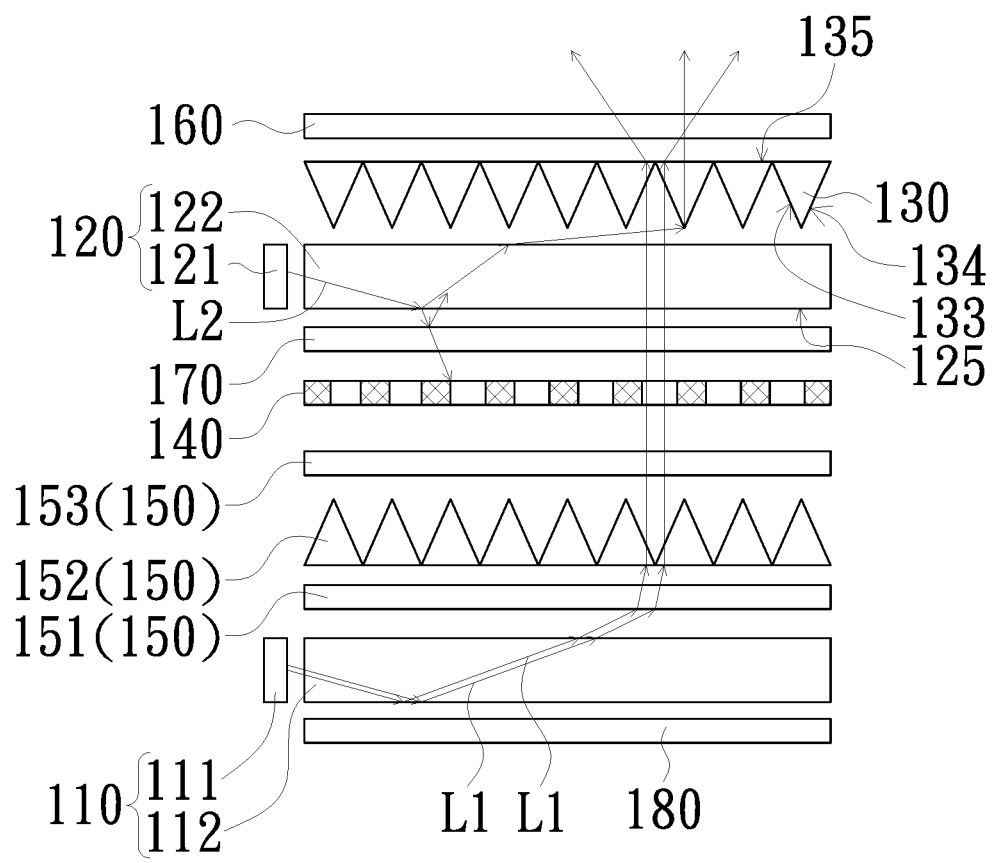
FIG. 2A is a schematic view of the backlight module of FIG. 1 in a wide viewing angle mode.
Figure 2B:
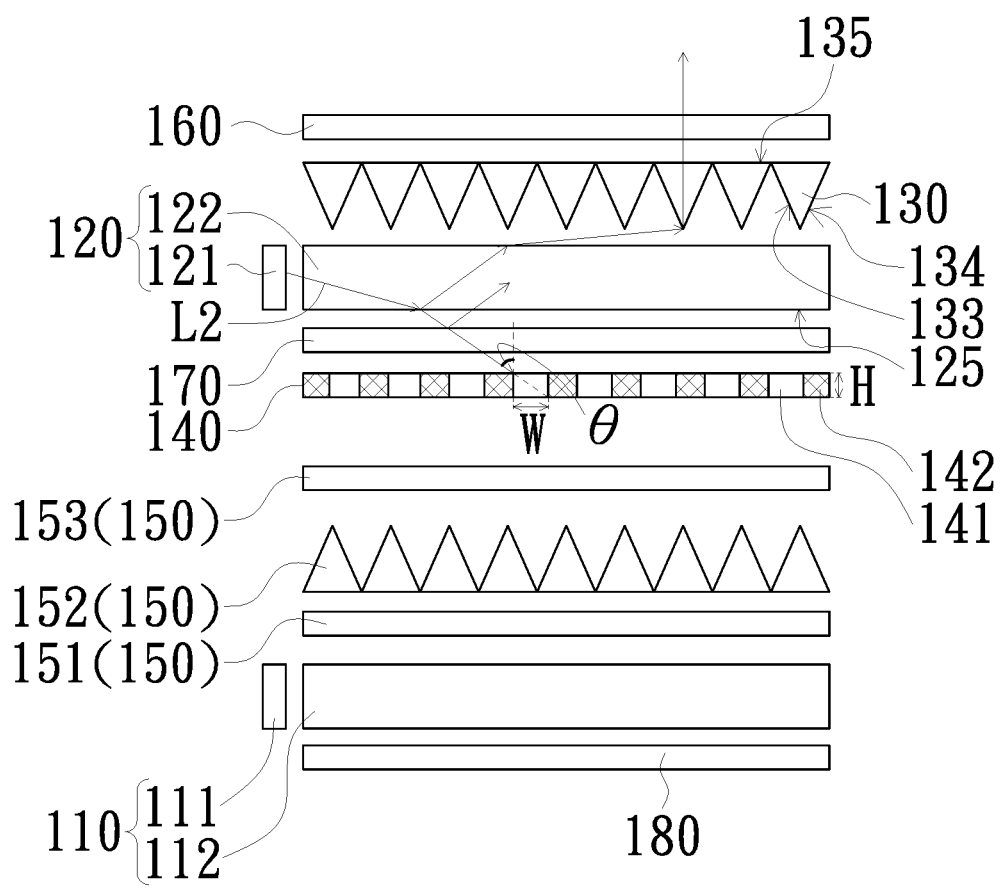
FIG. 2B is a schematic view of the backlight module of FIG. 1 in a narrow viewing angle mode

Referring to FIG. 2B, the light filter element 140 may has a grating structure formed by a plurality of alternately-arranged light-transmitting portions 141 and light-shielding portions 142. The light-transmitting portion 141 is configured to allow the incident light ray to pass therethrough and the light-shielding portion 142 is configured to reflect or absorb the incident light ray. In one embodiment, the aforementioned light-transmitting portion 141 is through holes or slots of the light filter element 140; and the aforementioned light-shielding portion 142 is made of light absorbing material (such as black resin) or light reflective material (such as metallic or white materials). Through controlling the thickness of the light-shielding portion 142 (may be defined as H) between the light-incident side and the light-exiting side of the light filter element 140 and the arrangement density of the light-shielding portions 142 (the distance between each two adjacent light-shielding portions 142 may be defined as W), only the light ray having an incident angle smaller than a predetermined angle $\theta$ can pass through the light filter element 140; wherein $\theta = \tan^{-1}(W/H)$. On the contrary, the light ray having an incident angle greater than the predetermined angle $\theta$ cannot pass through the light filter element 140.

In the present embodiment, the backlight module 100 may further include at least one second optical film 150 disposed between the first light guide plate 112 and the light filter element 140. The second optical film 150 is configured to homogenize the first surface light source or adjust the luminous intensity distribution of the first surface light source. FIG. 1 illustrates an exemplary embodiment including a plurality of second optical films 150. Specifically, these second optical films 150 may include a diffuser sheet 151, a prism sheet 152 and a diffuser sheet 153; wherein the prism sheet 152 is disposed between the diffuser sheet 151 and the diffuser sheet 153. The number, type and arranging sequence of the second optical films 150 are not limited in the present invention. In one embodiment, for example, the diffuser sheet 153 disposed above the prism sheet 152 may be omitted or replaced with a dual brightness enhancement film (DBEF). In another embodiment, the diffuser sheet 151 disposed under the prism sheet 152 may be also omitted. In the present embodiment, there is one prism sheet 152 and the axis extending direction of the prism thereof extends toward the second direction (e.g., Z-axis direction). Namely, the axis extending direction of the prism of the prism sheet 152 is same as that of the prism 131 of the first optical film 130. In one embodiment, the axis extending direction of the prism sheet 152 is perpendicular to that of the prism 131. In another embodiment, there is two prism sheets 152 and the axis extending directions of the prisms thereof intersect with each other (e.g., being perpendicular to each other). In addition, the backlight module 100 may further include a third optical film 160 disposed above the first optical film 130. The third optical film 160 is configured to homogenize the first surface light source and the second surface light source or adjust the luminous intensity distributions of the first surface light source and the second surface light surface. The third optical film 160 may be a diffuser sheet 153 or a dual brightness enhancement film, and the present invention is not limited thereto. Further, the backlight module 100 may further include a transparent back plate 170 disposed between the second light guide plate 122 and the light filter element 140. The transparent back plate 170 is configured to support the second surface light source assembly 120. The transparent back plate 170 may be further configured to reflect a portion of the light ray emitting from the second surface light source assembly 120 and allow another portion to pass therethrough. The backlight module 100 may further include a back plate 180 disposed under the first light guide plate 112. The back plate 180 is configured to support the first surface light source assembly 110. The back plate 180 may be further configured to reflect the light ray emitting out from the first bottom surface 115 of the first light guide plate 112 back into the first light guide plate 112, so as to improve the light utilization efficiency. The back plate 180 may be a metal back plate or a back plate coated with a reflective layer, and the present invention is not limited thereto. It is to be noted that the second optical film 150, the third optical film 160, the transparent back plate 170 and the back plate 180 are optional in one embodiment.

Hereunder a driving method of a backlight module (such as the aforementioned backlight module 100) in accordance with an embodiment of the present invention is described. Please refer to FIG. 2A, which is a schematic view of the backlight module of FIG. 1 in a wide viewing angle mode. As shown in FIG. 2A, when a wide viewing angle surface light source is desired to be provided, the driving method of a backlight module of the present embodiment includes a step of: driving the first light emitting unit 111 and the second light emitting unit 112 of the backlight module 100 to emit light rays. Please refer to FIG. 2B, which is a schematic view of the backlight module of FIG. 1 in a narrow viewing angle mode. As shown in FIG. 2B, when a narrow viewing angle surface light source is desired to be provided, the driving method of a backlight module of the present embodiment includes a step of: driving the second light emitting unit 112 to emit light rays and turning off the first light emitting unit 111.

Specifically, when the first light emitting unit 111 is turned on, the light ray L1 mainly emits into the first surfaces 133 and the second surfaces 134 of the prisms 131 of the first optical film 130 with a relatively-small incident angle and consequentially emits out from the light-exiting side 135 of the first optical film 130 with a relatively-large light-exiting angle. When the second light emitting unit 121 is turned on, the light ray L2 mainly emits into the first surfaces 133 and the second surfaces 134 of the prisms 131 of the first optical film 130 with a relatively-large incident angle and consequentially emits out from the light-exiting side 135 of the first optical film 130 with a relatively-small light-exiting angle. When both of the first light emitting unit 111 and the second light emitting unit 121 are tuned on, the light ray L1 with a relatively-large light-exiting angle and the light ray L2 with a relatively-small light-exiting angle emit out from the light-exiting side 135 of the first optical film 130 and are superimposed to form a wide viewing angle surface light source. Therefore, when both of the first light emitting unit 111 and the second light emitting unit 121 are tuned on, the backlight module is defined as being operated in a wide viewing angle mode. On the other hand, when the first light emitting unit 111 is turned off and the second light emitting unit 121 is turned on, the light ray L2 with a relatively-small light-exiting angle emits out from the light-exiting side 135 of the first optical film 130 to form a narrow viewing angle surface light source. Therefore, when the first light emitting unit 111 is turned off and the second light emitting unit 121 is turned on, the backlight module is defined as being operated in a narrow viewing angle mode.

Figure 3A:
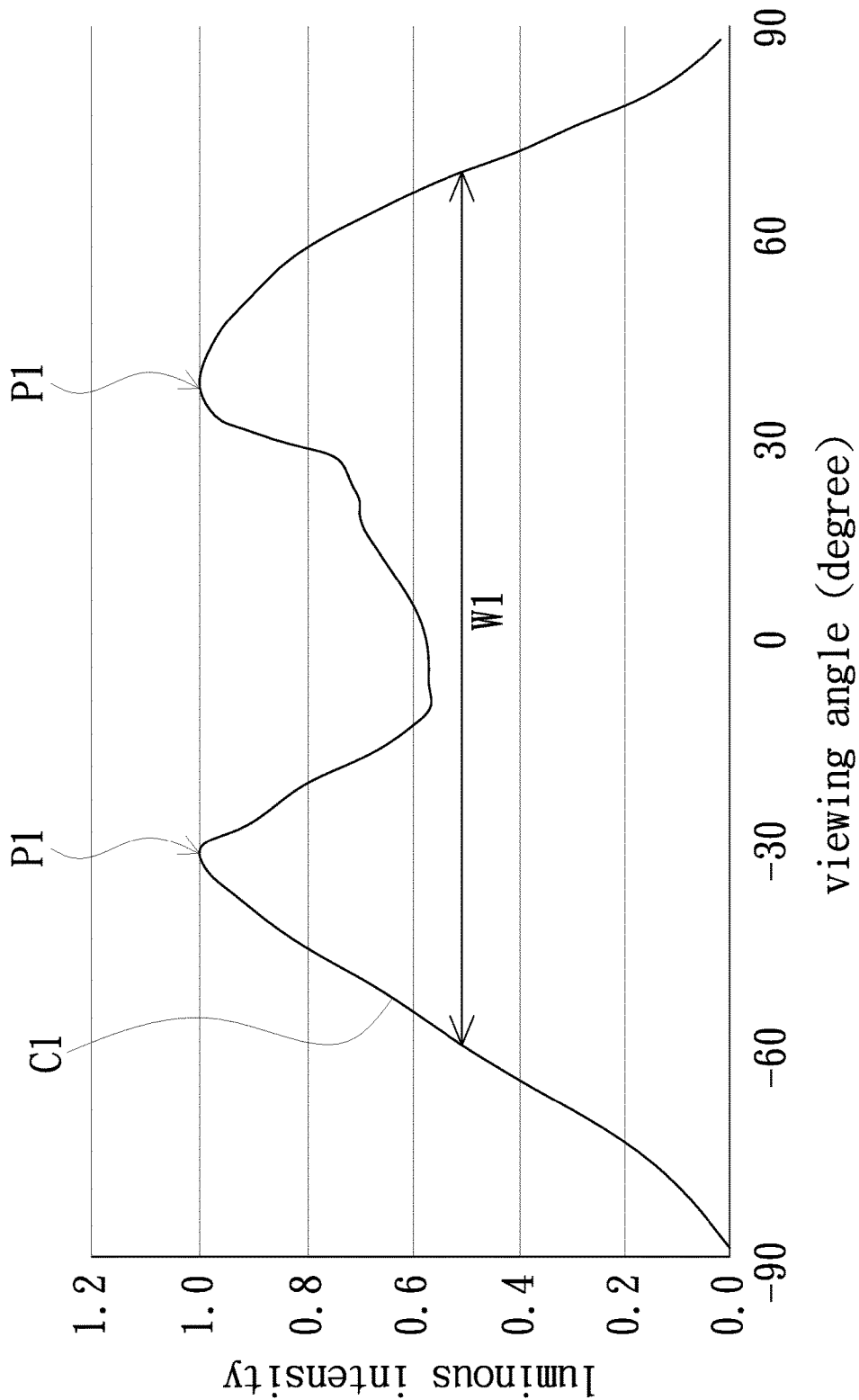
FIG. 3A is an exemplary plot of a first luminous intensity distribution of a first surface light source after passing through a first optical film in accordance with an embodiment of the present invention.
Figure 3B:
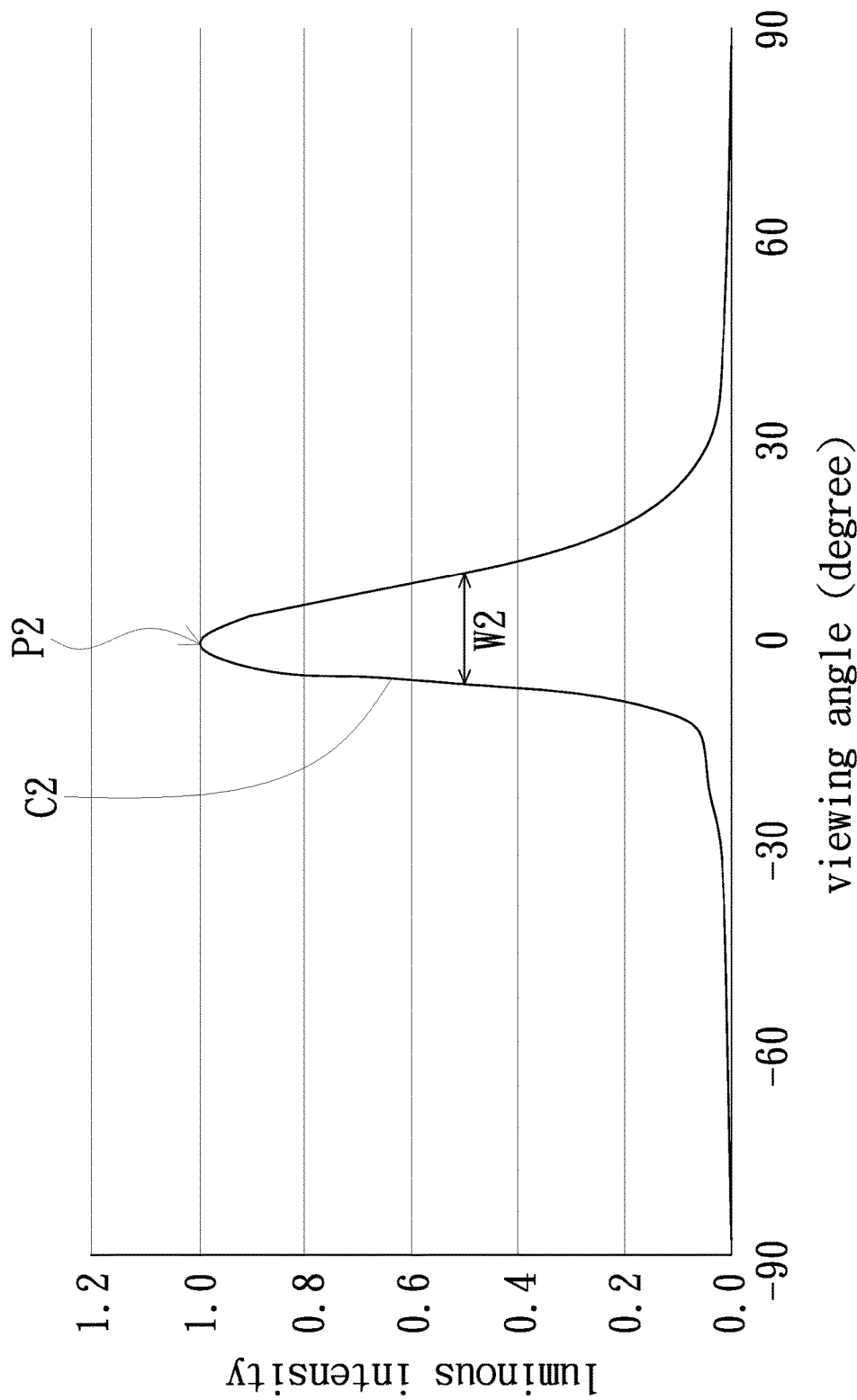
FIG. 3B is an exemplary plot of a second luminous intensity distribution of a second surface light source after passing through a first optical film in accordance with an embodiment of the present invention

FIG. 3A is an exemplary plot of a first luminous intensity distribution of the first surface light source provided by the first surface light source assembly 110 after passing through the first optical film 130 in accordance with an embodiment of the present invention. FIG. 3B is an exemplary plot of a second luminous intensity distribution of the second surface light source provided by the second surface light source assembly 120 after passing through the first optical film 130 in accordance with an embodiment of the present invention. Please refer to FIG. 3A and FIG. 3B. After the first surface light source and the second surface light source passing through the first optical film 130, the viewing angles of the first surface light source and the second surface light source have a first luminous intensity distribution C1 and a second luminous intensity distribution C2 in a first direction (e.g., a direction parallel to the X-axis of FIG. 1), respectively. The aforementioned first direction may be perpendicular to the axis extending direction of each prism 131 and parallel to the arranging direction of the prisms 131. Further, the aforementioned first direction may be perpendicular to the first light-incident surface 113 and the second light-incident surface 123. As shown in FIG. 3A and FIG. 3B, the first luminous intensity distribution C1 has two first peaks P1 and the second luminous intensity distribution C2 has a second peak P2. In one embodiment, the absolute value of the viewing angle corresponding to each first peak P1 is greater than the absolute value of the viewing angle corresponding to the second peak P2; and the full width at half maximum W1 of the first luminous intensity distribution C1 is greater than the full width at half maximum W2 of the second luminous intensity distribution C2. As shown in FIG. 3A, the luminous intensity of the portion corresponding to the relatively-large viewing angles (e.g., the portion corresponding to the two first peaks P1) is greater than the luminous intensity of the portion corresponding the relatively-small viewing angles (e.g., the trough defined between the two adjacent first peaks P1).

Figure 4:
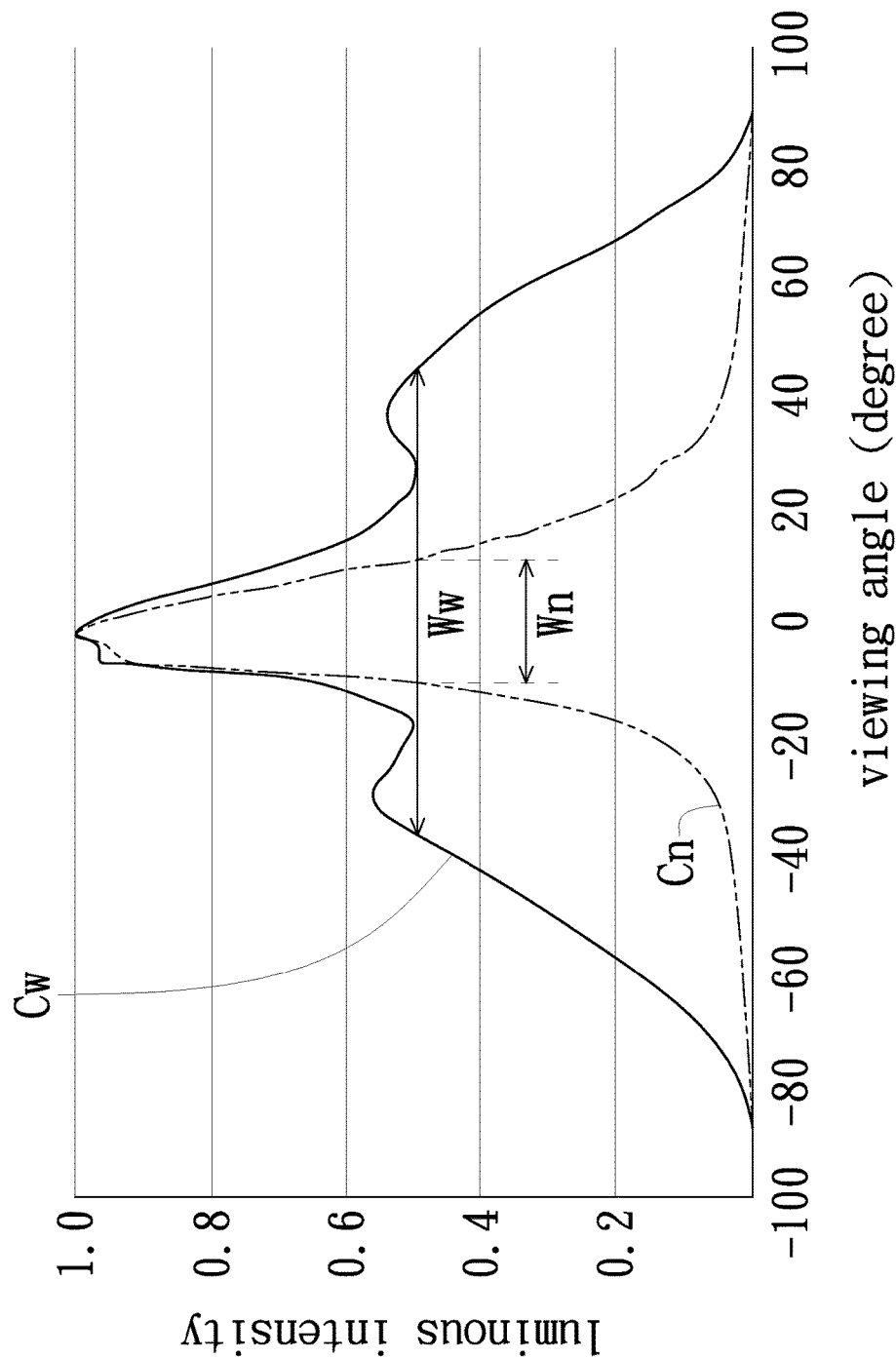
FIG. 4 is an exemplary plot of a luminous intensity distributions of a wide viewing angle surface light source and a narrow viewing angle surface light source in accordance with an embodiment of the present invention.

FIG. 4 is an exemplary plot of the luminous intensity distributions of a wide viewing angle surface light source and a narrow viewing angle surface light source in accordance with an embodiment of the present invention. In FIG. 4, the luminous intensity distribution of the wide viewing angle surface light source derived from the first luminous intensity distribution C1 and the second luminous intensity distribution C2 in the wide viewing angle mode is denoted as Cw; and the luminous intensity distribution of the narrow viewing angle surface light source derived from the first luminous intensity distribution C1 and the second luminous intensity distribution C2 in the narrow viewing angle mode is denoted as Cn. As shown in FIG. 4, the full width at half maximum Ww of the luminous intensity distribution Cw of the wide viewing angle surface light source indeed is greater than the full width at half maximum Wn of the luminous intensity distribution Cn of the narrow viewing angle surface light source. According to the luminous intensity distribution Cw, it is shown that by turning on both of the first light emitting unit 111 and the second light emitting unit 121 in the wide viewing angle mode, the luminous intensity corresponding to the portion of the first surface light source having a relatively-small viewing angle can be compensated by the luminous intensity corresponding to the portion of the second surface light source having a relatively-small viewing angle. Therefore, in the wide viewing angle mode of the present invention, the luminous intensity corresponding to the portion of the first surface light source having a relatively-small viewing angle can be compensated, optimized or enhanced by the second surface light source.

According to the above description, it is known that the backlight module 100 of the present embodiment can be switched between the wide viewing angle mode and the narrow viewing angle mode according to user's needs. Further, according to the driving method of a backlight module in one embodiment, when the first light emitting unit 111 or the second light emitting unit 121 is turned on, the current supplied to the first light emitting unit 111 or the second light emitting unit 121 can be further modulated to obtain a desired luminous intensity distribution. Specifically, in the wide viewing angle mode, the current of the first light emitting unit 111 and/or the second light emitting unit 121 is modulated to adjust the luminous intensity distribution of the wide viewing angle surface light source; and in the narrow viewing angle mode, the current of the second light emitting unit 121 is modulated to adjust the luminous intensity distribution of the narrow viewing angle surface light source.

As shown in FIG. 2B, it is to be noted that a portion of the light ray L2 provided by the second light emitting unit 121 may pass through the second bottom surface 125 of the second light guide plate 122 and emits towards the second optical film 150. Without the light filter element 140, the light ray L2 leaked from the second bottom surface 125 may result in a scattering when emitting to the second optical film 150. A portion of the scattered light ray emits into the first optical film 130 with a relatively-small incident angle and then emits out from the light-exiting side 135 of the first optical film 130 with a relatively-large light-exiting angle, thereby consequentially affecting the comparative performance in a narrow viewing angle mode. Because the backlight module 100 of the present embodiment is provided with the light filter element 140, only a small portion of the second light ray L2 (e.g., about 10% to 20%) leaked from the second bottom surface 125 will pass through the light filter element 140 and result in a scattering while emitting to the second optical film 150. Further, only a small portion of the scattered light ray (e.g., about 10% to 20%) can pass through the light filter element 140 and emits to the first optical film 130. Thus, in the present embodiment, the scattered light ray emitting to the first optical film 130 is significantly reduced, and consequentially the impact of the scattered light ray on the comparative performance in the narrow viewing angle mode is reduced and the comparative performance in the narrow viewing angle mode is improved.

In addition, the transparent back plate 170 reflects a portion of the light ray L2 from the second light guide plate 122 and allows another portion to pass therethrough. Therefore, the transparent back plate 170 can reflect a portion of the light ray L2 leaked from the second bottom surface 125 back into the second light guide plate 122, thereby improving the light utilization efficiency.

Figure 5:
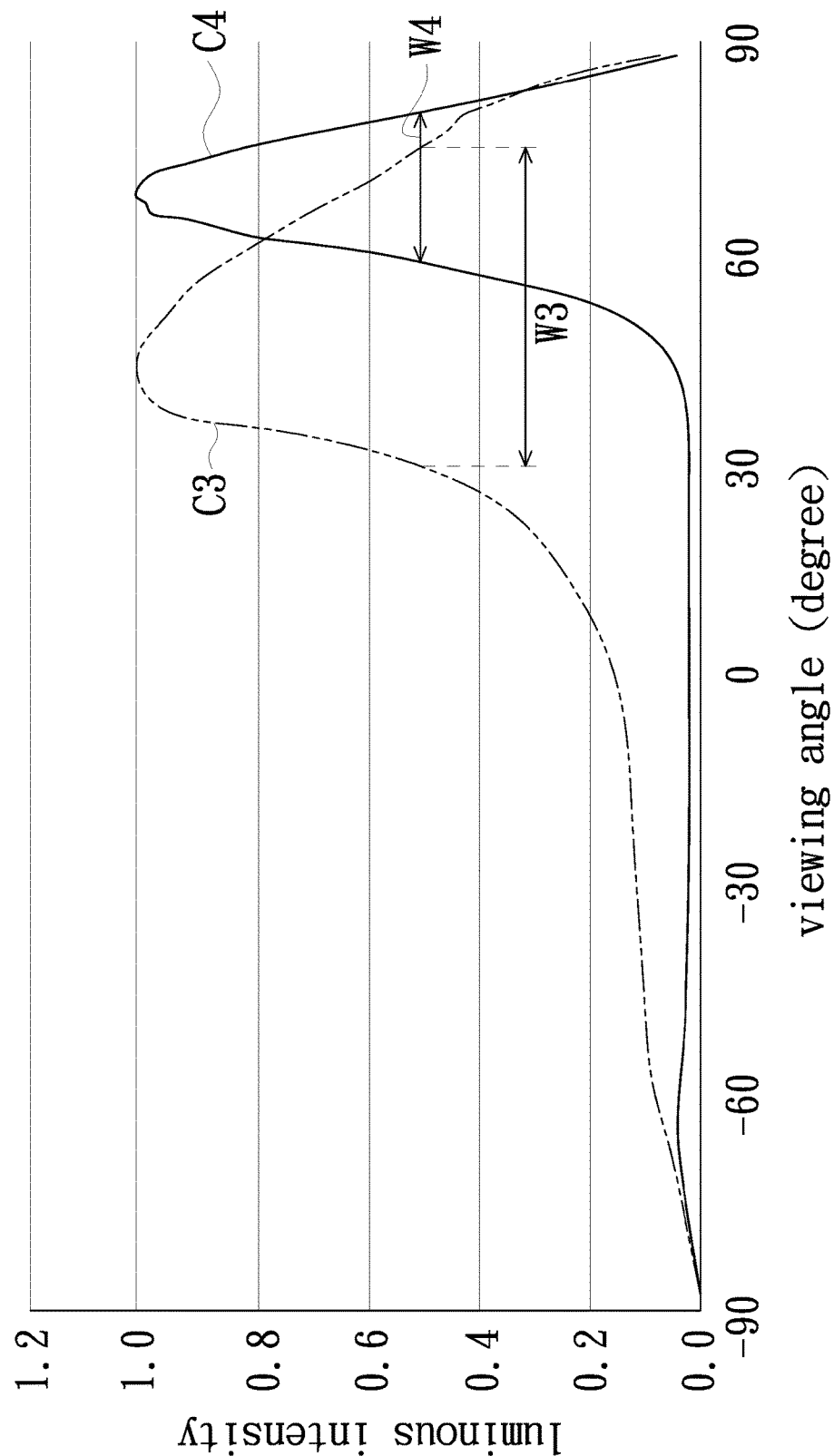
FIG. 5 is an exemplary plot of a third luminous intensity distribution of a first surface light source after emitting out from a first light guide plate and a fourth luminous intensity distribution of a second surface light source after emitting out from a second light guide plate in accordance with an embodiment of the present invention.

FIG. 5 is an exemplary plot of a third luminous intensity distribution of the first surface light source after emitting out from the first light guide plate and a fourth luminous intensity distribution of the second surface light source after emitting out from the second light guide plate in accordance with an embodiment of the present invention. Please refer to FIG. 5. After the first surface light source emitting out from the first light guide plate 112, the viewing angle of the first surface light source has a third luminous intensity distribution C3 in the first direction (e.g., a direction parallel to the X-axis of FIG. 1); after the second surface light source emitting out from the second light guide plate 122, the viewing angle of the second surface light source has a fourth luminous intensity distribution C4 in the first direction; and the full width at half maximum W3 of the third luminous intensity distribution C3 is greater than or equal to the full width at half maximum W4 of the fourth luminous intensity distribution C4. Namely, in the present embodiment, the first light guide plate 112 is a wide viewing angle light guide plate and the second light guide plate 122 is a narrow viewing angle light guide plate. In another embodiment, both of the first light guide plate 112 and the second light guide plate 122 are narrow viewing angle light guide plates but the first light guide plate 112 has a viewing angle wider than the second light guide plate 122.

Figure 6:
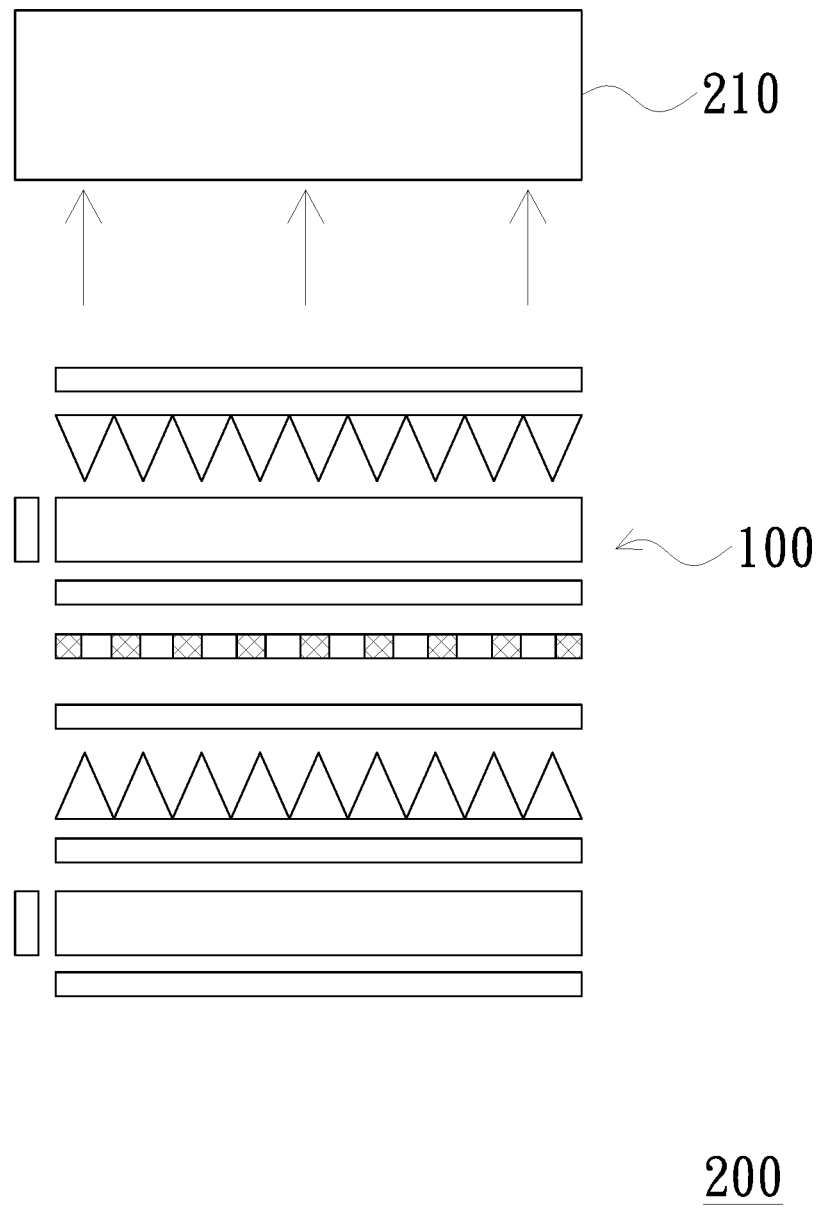
FIG. 6 is a schematic view of a display apparatus in accordance with an embodiment of the present invention.

FIG. 6 is a schematic view of a display apparatus in accordance with an embodiment of the present invention. As shown in FIG. 6, the display apparatus 200 of the present embodiment includes a display panel 210 and the backlight module 100. The display panel 210 is disposed above the backlight module 100 and may be a liquid crystal display panel or other types of non-self-luminous display panel.

Because the backlight module 100 can be switched between the wide viewing angle mode and the narrow viewing angle mode, either a wide viewing angle surface light source or a narrow viewing angle surface light source can be provided to the display panel 210 according to user's needs. Therefore, the display apparatus 200 of the present embodiment also can be switched between the wide viewing angle mode and the narrow viewing angle mode and consequentially has enhanced utilization.

In summary, according to the backlight mode and the driving method thereof according to the embodiments of the present invention, a wide viewing angle surface light source is provided by turning on both of the first light emitting unit and the second light emitting unit; and a narrow viewing angle surface light source is provided by turning off the first light emitting unit and turning on the second light emitting unit. Therefore, the backlight module of the present invention can be switched between the wide viewing angle mode and the narrow viewing angle mode and accordingly the display apparatus employing the aforementioned backlight module of the present invention can be switched between the wide viewing angle mode and the narrow viewing angle mode.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A backlight module, comprising:
   a first surface light source assembly, comprising a first light emitting unit and a first light guide plate, wherein the first light emitting unit is disposed adjacent to a first light-incident surface of the first light guide plate;
   a second surface light source assembly, disposed above the first surface light source assembly and comprising a second light emitting unit and a second light guide plate, wherein the second light emitting unit is disposed adjacent to a second light-incident surface of the second light guide plate;
   a first optical film, disposed above the second surface light source assembly and comprising a plurality of prisms arranged along a first direction, wherein each one of the plurality of prisms has a tip end facing the second surface light source assembly, and the first direction is perpendicular to the first light-incident surface and the second light-incident surface; and
   a light filter element, disposed between the first surface light source assembly and the second surface light source assembly, wherein the light filter element is configured to allow an incident light ray within a predetermined range of incident angle to pass through the light filter element;

wherein the first surface light source assembly is configured to provide a first surface light source, the second surface light source assembly is configured to provide a second surface light source, wherein after a light from the first surface light source and the second surface light source passing through the first optical film, viewing angles of the first surface light source and the second surface light source have a first luminous intensity distribution and a second luminous intensity distribution in the first direction, respectively, wherein the first luminous intensity distribution has two first peaks and the second luminous intensity distribution has a second peak, an absolute value of the viewing angle corresponding to each one of the first peaks is greater than an absolute value of the viewing angle corresponding to the second peak, and a full width at half maximum of the first luminous intensity distribution is greater than a full width at half maximum of the second luminous intensity distribution.

2. The backlight module according to claim 1, wherein a wide viewing angle mode is defined when both of the first light emitting unit and the second light emitting unit are turned on, wherein a narrow viewing angle mode is defined when the first light emitting unit is turned off and the second light emitting unit is turned on.

3. The backlight module according to claim 1, wherein after the light from the first surface light source emitting out from the first light guide plate, a viewing angle of the first surface light source has a third luminous intensity distribution in the first direction, wherein after the light from the second surface light source emitting out from the second light guide plate, a viewing angle of the second surface light source has a fourth luminous intensity distribution in the first direction, wherein a full width at half maximum of the third luminous intensity distribution is greater than or equal to a full width at half maximum of the fourth luminous intensity distribution.

4. The backlight module according to claim 1, wherein the light filter element has a grating structure.

5. The backlight module according to claim 1, further comprising at least one second optical film disposed between the first light guide plate and the light filter element.

6. The backlight module according to claim 1, further comprising a transparent back plate disposed between the second light guide plate and the light filter element, wherein the transparent back plate is configured to reflect a portion of light rays emitting from the second light guide plate and allow another portion of the light rays to pass the transparent back plate.

7. The backlight module according to claim 1, further comprising a back plate disposed under the first light guide plate.

8. The backlight module according to claim 1, further comprising a third optical film disposed above the first optical film.

9. A driving method of the backlight module claimed in claim 1, the driving method comprising:
   driving the first light emitting unit and the second light emitting unit of the backlight module to emit light rays when a wide viewing angle surface light source is desired to be provided; and
   driving the second light emitting unit to emit light rays and turning off the first light emitting unit when a narrow viewing angle surface light source is desired to be provided.

10. The driving method according to claim 9, further comprising: modulating a current of the first light emitting unit or the second light emitting unit when driving the first light emitting unit or the second light emitting unit to emit light rays.

11. A display apparatus, comprising;
   a backlight module, comprising:
      a first surface light source assembly, comprising a first light emitting unit and a first light guide plate, wherein the first light emitting unit is disposed adjacent to a first light-incident surface of the first light guide plate;
      a second surface light source assembly, disposed above the first surface light source assembly and comprising a second light emitting unit and a second light guide plate, wherein the second light emitting unit is disposed adjacent to a second light-incident surface of the second light guide plate;
      a first optical film, disposed above the second surface light source assembly and comprising a plurality of prisms arranged along a first direction, wherein each one of the plurality of prisms has a tip end facing the second surface light source assembly, and the first direction is perpendicular to the first light-incident surface and the second light-incident surface; and
      a light filter element, disposed between the first surface light source assembly and the second surface light source assembly, wherein the light filter element is configured to allow an incident light ray within a predetermined range of incident angle to pass through the light filter element;
   wherein the first surface light source assembly is configured to provide a first surface light source, the second surface light source assembly is configured to provide a second surface light source, wherein after a light from the first surface light source and the second surface light source passing through the first optical film, viewing angles of the first surface light source and the second surface light source have a first luminous intensity distribution and a second luminous intensity distribution in the first direction, respectively, wherein the first luminous intensity distribution has two first peaks and the second luminous intensity distribution has a second peak, an absolute value of the viewing angle corresponding to each one of the first peaks is greater than an absolute value of the viewing angle corresponding to the second peak, and a full width at half maximum of the first luminous intensity distribution is greater than a full width at half maximum of the second luminous intensity distribution; and
   a display panel, disposed above the backlight module.

12. The display apparatus according to claim 11, wherein a wide viewing angle mode is defined when both of the first light emitting unit and the second light emitting unit are turned on, wherein a narrow viewing angle mode is defined when the first light emitting unit is turned off and the second light emitting unit is turned on.

13. The display apparatus according to claim 11, wherein after the light from the first surface light source emitting out from the first light guide plate, a viewing angle of the first surface light source has a third luminous intensity distribution in the first direction, wherein after the light from the second surface light source emitting out from the second light guide plate, a viewing angle of the second surface light source has a fourth luminous intensity distribution in the first direction, wherein a full width at half maximum of the third luminous intensity distribution is greater than or equal to a full width at half maximum of the fourth luminous intensity distribution.

14. The display apparatus according to claim 11, wherein the light filter element has a grating structure.

15. The display apparatus according to claim 11, further comprising at least one second optical film disposed between the first light guide plate and the light filter element.

16. The display apparatus according to claim 11, further comprising a transparent back plate disposed between the second light guide plate and the light filter element, wherein the transparent back plate is configured to reflect a portion of light rays emitting from the second light guide plate and allow another portion of the light rays to pass the transparent back plate.

17. The display apparatus according to claim 11, further comprising a back plate disposed under the first light guide plate.

18. The display apparatus according to claim 11, further comprising a third optical film disposed above the first optical film.

19. A backlight module, comprising:
- a first surface light source assembly, comprising a first light emitting unit and a first light guide plate, wherein the first light emitting unit is disposed adjacent to a first light-incident surface of the first light guide plate;
- a second surface light source assembly, disposed above the first surface light source assembly and comprising a second light emitting unit and a second light guide plate, wherein the second light emitting unit is disposed adjacent to a second light-incident surface of the second light guide plate;
- a first optical film, disposed above the second surface light source assembly and comprising a plurality of prisms arranged along a first direction, wherein each one of the plurality of prisms has a tip end facing the second surface light source assembly, and the first direction is perpendicular to the first light-incident surface and the second light-incident surface; and
- a light filter element, disposed between the first surface light source assembly and the second surface light source assembly, wherein the light filter element is configured to allow an incident light ray within a predetermined range of incident angle to pass through the light filter element;
wherein the light filter element has a grating structure.

20. A backlight module, comprising:
- a first surface light source assembly, comprising a first light emitting unit and a first light guide plate, wherein the first light emitting unit is disposed adjacent to a first light-incident surface of the first light guide plate;
- a second surface light source assembly, disposed above the first surface light source assembly and comprising a second light emitting unit and a second light guide plate, wherein the second light emitting unit is disposed adjacent to a second light-incident surface of the second light guide plate;
- a first optical film, disposed above the second surface light source assembly and comprising a plurality of prisms arranged along a first direction, wherein each one of the plurality of prisms has a tip end facing the second surface light source assembly, and the first direction is perpendicular to the first light-incident surface and the second light-incident surface;
- a light filter element, disposed between the first surface light source assembly and the second surface light source assembly, wherein the light filter element is configured to allow an incident light ray within a predetermined range of incident angle to pass through the light filter element; and
- a transparent back plate, disposed between the second light guide plate and the light filter element, wherein the transparent back plate is configured to reflect a portion of light rays emitting from the second light guide plate and allow another portion of the light rays to pass the transparent back plate.

21. A display apparatus, comprising;
a backlight module, comprising:
- a first surface light source assembly, comprising a first light emitting unit and a first light guide plate, wherein the first light emitting unit is disposed adjacent to a first light-incident surface of the first light guide plate;
- a second surface light source assembly, disposed above the first surface light source assembly and comprising a second light emitting unit and a second light guide plate, wherein the second light emitting unit is disposed adjacent to a second light-incident surface of the second light guide plate;
- a first optical film, disposed above the second surface light source assembly and comprising a plurality of prisms arranged along a first direction, wherein each one of the plurality of prisms has a tip end facing the second surface light source assembly, and the first direction is perpendicular to the first light-incident surface and the second light-incident surface; and
- a light filter element, disposed between the first surface light source assembly and the second surface light source assembly, wherein the light filter element is configured to allow an incident light ray within a predetermined range of incident angle to pass through the light filter element;
wherein the light filter element has a grating structure; and
a display panel, disposed above the backlight module.

22. A display apparatus, comprising;
a backlight module, comprising:
- a first surface light source assembly, comprising a first light emitting unit and a first light guide plate, wherein the first light emitting unit is disposed adjacent to a first light-incident surface of the first light guide plate;
- a second surface light source assembly, disposed above the first surface light source assembly and comprising a second light emitting unit and a second light guide plate, wherein the second light emitting unit is disposed adjacent to a second light-incident surface of the second light guide plate;
- a first optical film, disposed above the second surface light source assembly and comprising a plurality of prisms arranged along a first direction, wherein each one of the plurality of prisms has a tip end facing the second surface light source assembly, and the first direction is perpendicular to the first light-incident surface and the second light-incident surface;
- a light filter element, disposed between the first surface light source assembly and the second surface light source assembly, wherein the light filter element is configured to allow an incident light ray within a predetermined range of incident angle to pass through the light filter element; and
- a transparent back plate, disposed between the second light guide plate and the light filter element, wherein the transparent back plate is configured to reflect a portion of light rays emitting from the second light guide plate and allow another portion of the light rays to pass the transparent back plate; and
a display panel, disposed above the backlight module.

* * * * *